US007057617B1

(12) United States Patent
Nishida

(10) Patent No.: US 7,057,617 B1
(45) Date of Patent: Jun. 6, 2006

(54) FONT MEMORY AND FONT DATA READING METHOD

(75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

(21) Appl. No.: 09/673,612

(22) PCT Filed: Feb. 18, 2000

(86) PCT No.: PCT/JP00/00935

§ 371 (c)(1),
(2), (4) Date: Oct. 19, 2000

(30) Foreign Application Priority Data

Feb. 19, 1999 (JP) ................................ 11-042221

(51) Int. Cl.
*G06T 11/00* (2006.01)

(52) U.S. Cl. ...................................................... 345/472

(58) Field of Classification Search ................ 715/542; 345/471, 472, 667, 660, 472.2, 472.1, 467; 382/177

See application file for complete search history.

(56) References Cited

U.S. PATENT DOCUMENTS 3,911,420 A * 10/1975 Lampson .................... 345/472
4,152,697 A * 5/1979 Rider et al. .................... 341/63
4,242,678 A * 12/1980 Somerville ............... 345/472.2
4,254,416 A * 3/1981 Lelke ......................... 345/472
4,283,724 A * 8/1981 Edwards ...................... 345/26
4,566,002 A * 1/1986 Miura et al. ................ 345/658
4,594,674 A * 6/1986 Boulia et al. ............... 345/471
4,613,945 A * 9/1986 Parker ........................ 345/471
4,745,561 A * 5/1988 Hirosawa et al. ........... 345/471
4,847,787 A * 7/1989 Nishiyama et al. ......... 345/471
4,907,282 A * 3/1990 Daly et al. .................. 382/242
4,992,954 A * 2/1991 Takeda et al. .............. 715/542
5,027,304 A * 6/1991 Jeng et al. .................. 345/170
5,045,869 A * 9/1991 Isaka et al. ................. 347/254
5,189,523 A * 2/1993 Sugiura et al. ............. 358/300
5,222,208 A * 6/1993 Matsuhira
5,414,527 A * 5/1995 Koshi et al. ................ 382/239
5,522,023 A * 5/1996 Kawanabe .................. 345/170
5,664,086 A * 9/1997 Brock et al. ................ 345/468
5,708,844 A * 1/1998 Masu et al. ................. 715/542
5,734,873 A * 3/1998 Lobodzinski et al. ....... 345/548
5,740,462 A * 4/1998 Igarashi ...................... 715/542
5,751,857 A * 5/1998 Kobayashi .................. 382/232
5,805,783 A * 9/1998 Ellson et al. ............... 345/468
5,835,100 A * 11/1998 Matsufusa .................. 345/467

(Continued)

FOREIGN PATENT DOCUMENTS

JP HEI 3-33895 A 2/1991

(Continued)

*Primary Examiner*—Ryan Yang
(74) *Attorney, Agent, or Firm*—Sughrue Mion, PLLC

(57) ABSTRACT

Font data for each resolution level is stored in a font memory (10). Character specifying addresses $A_0$ to $A_x$ and font resolution levels $L_0$ to $L_z$ are input to output the optimum font data that match the resolution of an output device such as a display device or a printer. As a result, for example, it is possible to specify font data having a higher resolution level when enlarging a display on a display device or when printing from a printer capable of a high quality output, and it is possible to specify font data having a low resolution level when reducing a screen display on a display device and when confirming a layout.

24 Claims, 8 Drawing Sheets

U.S. PATENT DOCUMENTS

| | | | | | |
|---|---|---|---|---|---|
| 5,877,776 | A | * | 3/1999 | Beaman et al. | 345/472 |
| 5,909,538 | A | * | 6/1999 | Sakurai | 358/1.16 |
| 6,130,966 | A | * | 10/2000 | Sekine et al. | 382/299 |
| 6,185,254 | B1 | * | 2/2001 | Ogata | 375/240.19 |
| 6,522,336 | B1 | * | 2/2003 | Yuasa | 345/582 |
| 6,593,902 | B1 | * | 7/2003 | Ogino et al. | 345/55 |
| 6,909,522 | B1 | * | 6/2005 | Nishida | 358/1.9 |

FOREIGN PATENT DOCUMENTS

| | | | | |
|---|---|---|---|---|
| JP | HEI 7-15600 | A | | 6/1995 |
| JP | HEI 7-242023 | A | | 9/1995 |
| JP | HEI 9-68961 | A | | 3/1997 |
| JP | 04 10290367 | | * | 10/1998 |
| JP | 11-042221 | | | 3/2003 |

* cited by examiner

FIG.7

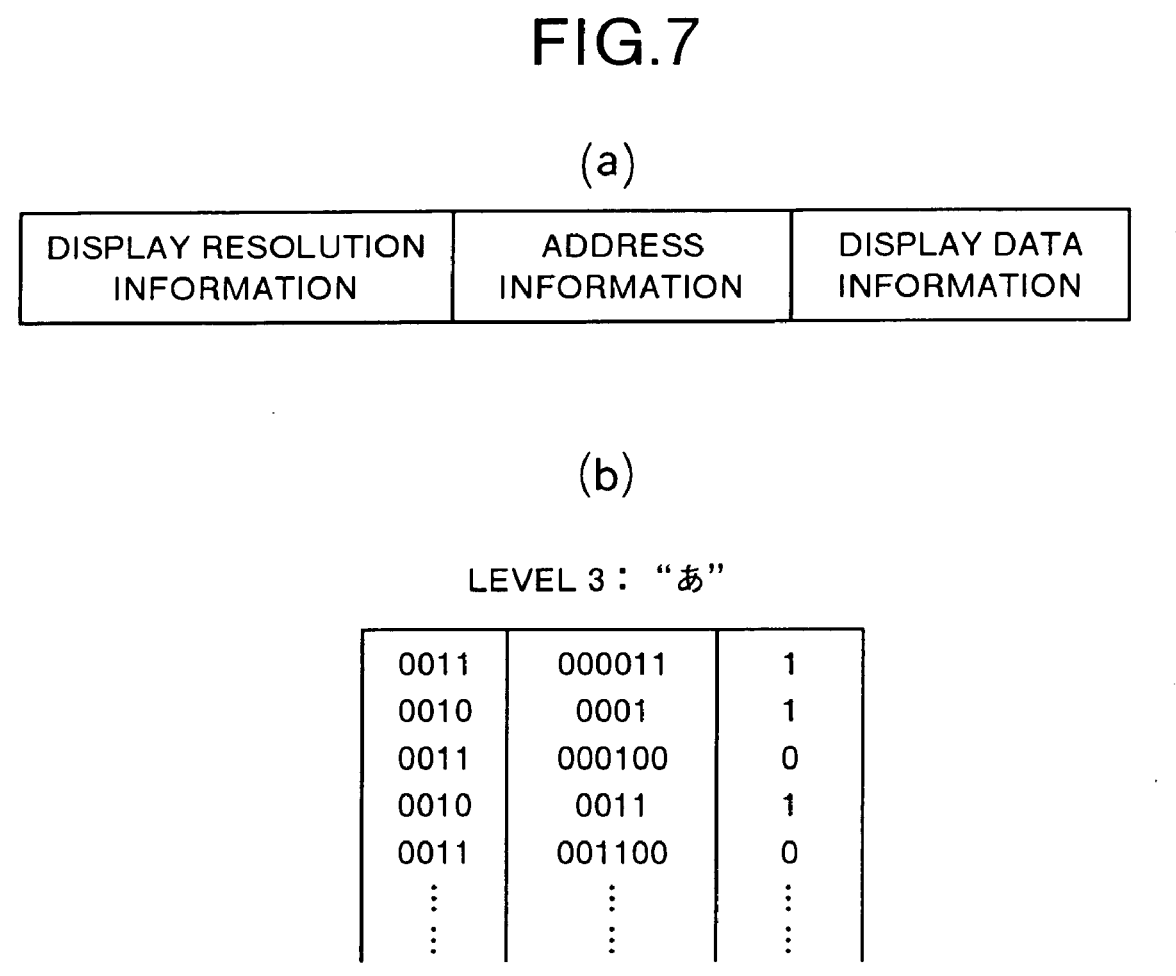

(a)

| | | |
|---|---|---|
| DISPLAY RESOLUTION INFORMATION | ADDRESS INFORMATION | DISPLAY DATA INFORMATION |

(b)

LEVEL 3 : “あ”

| | | |
|---|---|---|
| 0011 | 000011 | 1 |
| 0010 | 0001 | 1 |
| 0011 | 000100 | 0 |
| 0010 | 0011 | 1 |
| 0011 | 001100 | 0 |
| ⋮ | ⋮ | ⋮ |

FONT MEMORY AND FONT DATA READING METHOD

TECHNICAL FIELD

The present invention relates to a font memory for storing font data that is output when printing the characters or displaying the characters on a display device. This invention also relates to a method for reading out the font data.

BACKGROUND ART

In conventional computers and word processors, identification of the characters input through a keyboard or identification of the characters that have been specified through some sort of input is realized by allocating a character code specific to each character. The character codes of normally used characters is standardized. Further, data compatibility between various types of computers and softwares is maintained when document files are being processed.

Although the character codes have been standardized, the character typeface (i.e. the font) displayed on the basis of these character codes exists in a variety of forms. Accordingly, when the characters are output to an output device, i.e. displayed on a display device or printed using a printer, in addition to the role as communication of information, the characters are used to impart a visual effect. Due to the increasing use of personal computers, recent years, in particular, have seen a simplification of DTP (desktop publishing) which has led in turn to an increased demand for a variety of types of font data.

Font data is generally supplied in a state where it has been written to a font memory such as exclusive ROM (Read Only Memory) or a storage medium such as a CD-ROM or the like. Further, fonts are classified into outline fonts and bitmap fonts based on the difference in the data format. Bitmap fonts are formed from a dot pattern that represents characters by the arrangement of the dots on a matrix. The font output result is obtained by the final output of this dot pattern on a display device or printer.

On the other hand, bitmap fonts require different data corresponding to each font size. Therefore, a great deal of data is needed to match the plurality of sizes. In contrast, outline fonts are formed in a template representing an outline using several points and lines joining the points. While it is possible to provide a plurality of sizes, a calculation is required to expand the font data in order to obtain the actual font pattern.

Moreover, the aforementioned font memory is usually built into a printer. Accordingly, instead of outputting the dot pattern sent from a computer or the like, output becomes possible by creating or extracting a dot pattern from the printer's own font memory according to the specified character code and font type. In this case, it is normal to built-in an exclusive font processing controller into the printer enabling a font to be output at a faster speed than if the font calculation processing were performed in the computer.

However, in case of the bitmap font, even for a font of same type and size, the quality of the font obtained differs depending on the specifications, and particularly on the resolution, of the destination display device or printer. For example, the design of a font output from respective printers or display devices having different resolutions is different.

Furthermore, after the expansion calculation for an outline font, it too is processed as a dot pattern resulting in it also having the same problems as a bitmap font. In addition, because an outline font requires a calculation processing, a load is placed on the CPU of the computer which then places a burden on the processing of other tasks by the CPU.

Moreover, in a computer and the like, when font data is used directly from a storage medium such as a CD-ROM or the like, or when it is installed on a built-in magnetic disk or the like and used, processing is required to access the storage medium or the magnetic disk. This access processing takes a far longer time than when the aforementioned font memory is used and is a main factor in slowing the output to a display device or printer.

Furthermore, when the font memory built into a printer is used, even if the font is the same size and same type, generally, font data defined specifically by that printer manufacturer is stored in the font memory and it is often the case that a font is output in a pattern slightly different from the font pattern displayed on the display device.

Moreover, because it is possible to confirm the approximate layout of a character on the display device, this is sufficient for most uses. It is usually only necessary to display a high quality font in an output result obtained when printing using a printer. However, when a high resolution, large sized display device is used, or when it is necessary to enlarge the display of a character on the display device, it is desirable for a font with a smooth outline to be displayed. Accordingly, there is a demand for a font memory capable of outputting font data of different resolutions to comply with the purpose of the use and the application.

DISCLOSURE OF THE INVENTION

It is an object of the present invention to provide a font memory and a font data reading method capable of storing a plurality of font data having different resolutions for each character code, and outputting font data in the optimum resolution according to the resolution level of the output device.

In the font memory according to the present invention, a plurality of groups of font data having different resolutions and represented by a dot pattern are stored for respective character codes, the font memory comprising: a plurality of first input terminals for an input of character specifying address signals for specifying font data corresponding to the character codes; a plurality of second input terminals for an input of resolution level signals for specifying resolution levels of the font data; and a plurality of output terminals for an output of font data in accordance with an input of the first input terminal and the second input terminal, wherein, based on character specifying address signals input from the first input terminals and on resolution level signals input from the second input terminals, font data that corresponds to the character codes specified by the character specifying address signals and corresponds to the resolution levels specified by the resolution level signals is output from the output terminals.

Further, in the font memory according to the present invention, a plurality of groups of font data having different resolutions and represented by a dot pattern are stored for respective character codes, the font memory comprising: a plurality of first input terminals for an input of character specifying address signals for specifying font data corresponding to the character codes; a plurality of first output terminals for an output of font data in accordance with an input of the first input terminals; and a plurality of second output terminals for an output of resolution level signals representing a resolution level of the font data. The resolution level is sequentially altered at a predetermined timing and, in addition to font data corresponding to the character code specified by the character specifying address signals and corresponding to the resolution level being output from the first output terminals, resolution signals representing the resolution level are output from the second output terminals.

Further, in the font memory according to the present invention, the font memory is provided with a plurality of density level output terminals for an output of density level signals specifying density levels when the dot patterns are displayed, and, based on the number of dots in the dot pattern, a density level is calculated when the dot pattern is displayed and density level signals specifying the calculated density level are output from the density level output terminals.

Further, in the font memory according to the present invention, an exclusive address is given to each dot forming the dot pattern, and the font data is information representing the dot pattern using the address exclusive to a particular dot.

Further, in the font memory according to the present invention, the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and, moreover, the font data is information representing the dot pattern using the addresses obtained by repeating the above division and address allocation thereafter for an optional number of times.

Further, in the font memory according to the present invention, the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and, moreover, the font data is information representing the dot pattern using the addresses obtained by repeating the above division and address allocation thereafter for an optional number of times. Further, in the font data reading method according to the present invention, based on character specifying address signals for specifying font data corresponding to the character codes and on resolution level signals specifying a resolution level of the font data, font data corresponding to the character codes specified by the character specifying address signals and corresponding to a resolution level specified by the resolution level signals is read from an information storage medium on which is stored a plurality of groups of font data having different resolutions and represented by a dot pattern are stored for respective character codes.

BRIEF DESCRIPTION OF THE DRAWINGS

FIG. 7 is an explanatory diagram showing the structure of a character structure address output from the font memory according to the fourth embodiment.

BEST MODE FOR CARRYING OUT THE INVENTION

Preferred embodiments of the font memory according to the present invention will now be described in detail based on the drawings. However, the present invention is not limited by these embodiments.

Figure 1:
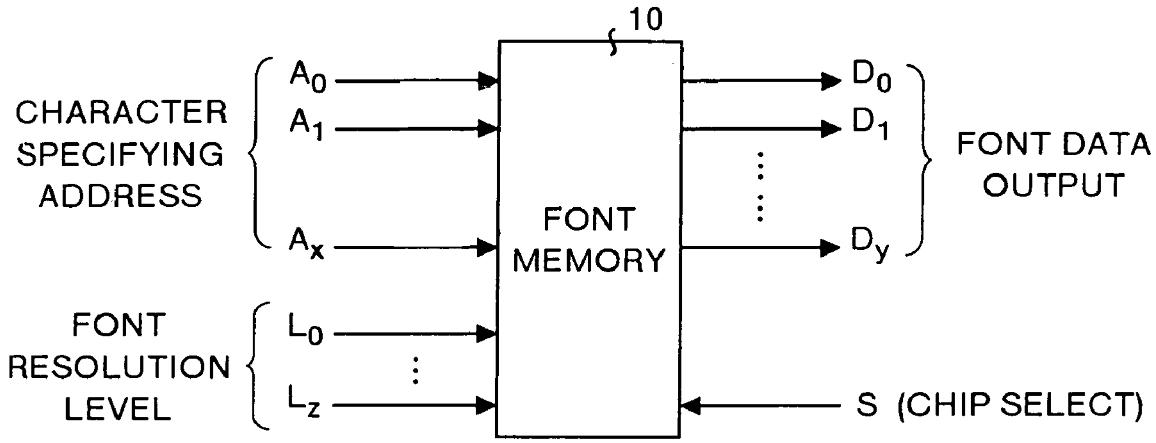
FIG. 1 is an explanatory diagram showing the font memory according to the first embodiment.

FIG. 1 is an explanatory diagram showing the font memory according to the first embodiment. The data corresponding to each character code of many bitmap fonts is stored in the font memory 10. For example, font data for the Minchotai font (a font for Japanese script), the Gothic font, the POP font, and the like is stored for one character code. Further, font data for each of a plurality of resolution levels of the fonts for each character code is also stored in the font memory 10. For example, assume that there are 3000 characters (types of characters) in one character code, three types of fonts, and each font has five resolution levels. In this case, bitmap font data of amount 3000×3×5 is stored in the font memory 10.

The resolution level referred to here is a numerical value based on the number of dots necessary for forming a single character and indicates the degree of expression of the detailed portions of a character pattern. In addition, this resolution level corresponds to the inverse of the dot pitch of a display device and the dpi (dots per inch) of a printer. There is no particular limitation to the type of the font memory 10 provided that it is non-volatile memory. The font memory 10 may be a PROM (programmable ROM), an EPROM (Erasable PROM), a semiconductor memory such as a flash memory or a FRAM (ferroelectric random access memory), or a memory module comprising a combination of a plurality of these. In particular, in recent years, large volume semiconductor memory has become available at low cost, and it is possible to store a large volume of data to which the font data for each resolution level described above has been added.

In FIG. 1, $A_0$ to $A_x$ are input signals indicating addresses for specifying the characters (hereafter, character specifying address). These signals specify in which storage area (memory cell group) in the font memory 10 a font pattern determined by the font type and character code specified by a computer program or the like is stored. $L_0$ to $L_x$ are input signals indicating font resolution levels. These signals specify font data corresponding to the resolution level indicated by the font resolution level from among the font patterns specified by the above character specifying address.

Signals $D_0$ to $D_y$ indicate output font data. These signals represent font data specified by the above character specifying address and font resolution level. S indicates chip select signals and comprises input signals for activating the font memory 10, namely, for placing it in a usable state. In addition, these signals are also effective when a plurality of font memories 10 are mounted together in order to store a huge amount of font data. In addition, these chip select signals can be used at the output timing of the font data outputs $D_0$ to $D_y$. In addition to the chip select signals, clock signals and exclusive timing signals can also be input into the font memory 10, however, these have been omitted here from the drawing.

The bus width of the character specifying addresses $A_0$ to $A_x$, namely, the value of x depends on the capacity of the font memory 10. The bus width of the character specifying addresses $D_0$ to $D_y$, namely, the value of y depends on the bus width of the internal data bus of the system in which the font memory 10 is provided. The bus width of the font data outputs $D_0$ to $D_y$ is, for example, 16 bit or 32 bit.

The bit number formed by the font resolution level $L_0$ to $L_z$ also depends on the capacity of the font memory 10. If the capacity of the font memory 10 is larger, it is possible to store font data that corresponds to more resolution levels, and to increase the value of z to accompany this. For example, it is possible to specify font data of different resolutions using numerical values indicated by the font resolution level. Namely, if the font resolution level is expressed by 4 bits, the value of z is 3 and there are 8×8 dots of font data at "0011" which represents level 3. At "0100", which represents level 4, there are 16×16 dots of font data. At "0101", which represents level 5, there are 32×32 dots of font data. At "0110", which represents level 6, there are 64×64 dots of font data. At "0111", which represents level 7, there are 128×128 dots of font data, and so on.

Note that, here, font resolution levels of level 2 and below were not included because it is difficult to identify characters at this resolution, however, they can also be used as effective font data when simply confirming the existence or otherwise of character placement in the display on a display device or in the layout of the result of a print.

Figure 2:
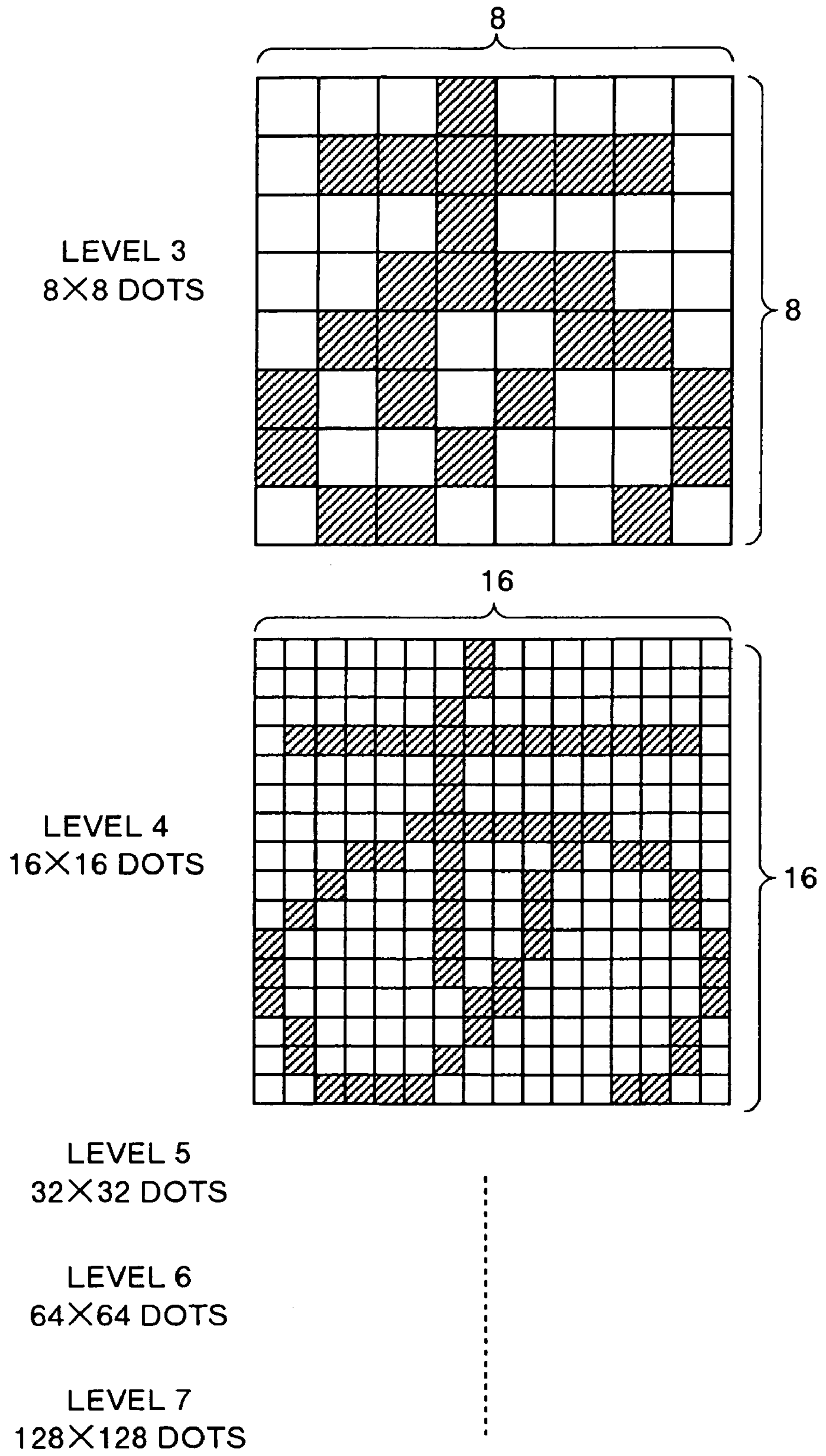
FIG. 2 is a diagram showing an example of font data when the font resolution level is level 3 or level 4.

FIG. 2 shows an example of font data when the font resolution level is 3 and 4. In FIG. 2, the font pattern for the Japanese hiragana alphabet character あ(Roman alphabet=a) is shown as an example. As can be clearly seen in FIG. 2, the representation of the detailed portions is different in the level 3 and level 4 font patterns. Level 4, which is the higher resolution level, has an improved degree of character recognition and a more pleasing appearance.

For example, if the level 3 font "あ" shown in FIG. 2 is specified, in the font memory 10, data, in which the existence or otherwise of a dot on each cell on an 8×8 matrix is indicated by bits, is output as font data outputs $D_0$ to $D_y$. In this case, if the bus width of the font data output is set at 16 bits, the sets of data obtained by dividing the matrix either vertically or horizontally into two sections of 8 bits can be output one after the other for every two sets. In the same way, it is possible to output font patterns corresponding to other resolution levels using a dividing method that corresponds to the font data outputs $D_0$ to $D_y$ bus width.

As described above, according to the font memory 10 of the first embodiment, by storing font data that is different for each resolution level, and by specifying character specifying addresses $A_0$ to $A_x$ and font resolution levels $L_0$ to $L_z$, it is possible to obtain from the font data outputs $D_0$ to $D_y$ the optimum font data to match the resolution of an output device such as a display device or a printer. Therefore, for example, when enlarging a display on a display device or when printing from a printer capable of high quality output, font data having a higher resolution level can be selected, and when using a reduced screen display or confirming a layout, font data having a lower resolution level can be selected. Moreover, there is no unnecessary load on a CPU or controller performing the font output processing and an efficient rapid font output result can be obtained.

Moreover, because the font data is stored in semiconductor memory and used, the access time thereof is shortened in comparison with when it is stored on a fixed magnetic disk or a recording medium such as a CD-ROM or the like, enabling faster font output processing to be performed. Furthermore, because font data in bitmap format based on a dot pattern is stored directly, there is no need for the development calculation to obtain the font pattern, as is the case with an outline font. This imposes no load on the CPU or controller and enables rapid font output processing to be performed.

The font memory 10 above described can be used, apart from in computers, word processors, or printers, in OCRs (optical character reader) for storing the font data to be used in character recognition or in electric sign boards when displaying characters.

Next, the font memory according to the second embodiment will be described. In the font memory according to the second embodiment, the input of the font resolution levels $L_0$ to $L_z$ in the font memory according to the above first embodiment is not performed. Instead, the font resolution level is continuously altered from the font data specified by the character addresses $A_0$ to $A_x$, and the font data of the altered font resolution level is output at the same time as the relevant font resolution level is output.

Figure 3:
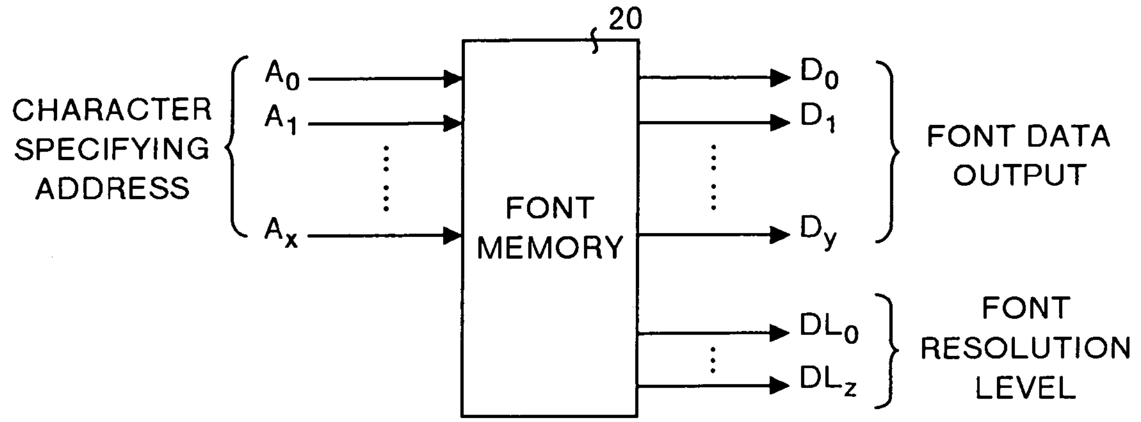
FIG. 3 is an explanatory diagram showing the font memory according to the second embodiment.

FIG. 3 is an explanatory diagram showing the font memory according to the second embodiment. In FIG. 3, the font memory 20 differs from the font memory according to the first embodiment in that the input of the font resolution levels $L_0$ to $L_z$ is not performed and the output of the font resolution levels $DL_0$ to $DL_z$ is performed.

When the character specifying addresses $A_0$ to $A_x$ are input into the font memory 20, firstly, the area where the font data corresponding to the input character specifying address is stored is specified. Next, the font memory 20 sets the font resolution to the lowest resolution level, extracts the font data corresponding to the set lowest resolution level, and outputs the extracted font data as font data outputs $D_0$ to $D_y$. At this time, simultaneously, signals indicating the lowest resolution levels are output as font resolution levels $DL_0$ to $DL_z$.

The font memory 20 counts up the font resolution level by inputting unillustrated timing signals or a predetermined number of clocks and alters the next highest resolution level and font resolution level from the lowest resolution level. The font memory 20 then extracts the font data corresponding to the altered resolution level and, in the same way as described above, outputs the extracted font data and the altered resolution level. By again inputting unillustrated timing signals or a predetermined number of clocks, the font resolution level is counted up and the above operation is repeated.

Here, the above timing signals or clocks are input into the CPU of the device in which the font memory 20 is incorporated or the output device that is trying to obtain font data from the font memory 20, and the font resolution levels output from the font memory 20 are observed and, at the same time as the desired font resolution level is accepted, the font data output from the font data outputs $D_0$ to $D_y$ is acquired.

In this way, the CPU of the device in which the font memory 20 is provided or the output device that is trying to use the font memory 20 is able to obtain in sequence font data having different resolution levels from the font memory

20. Therefore, when the font data of a plurality of different resolution levels is acquired, there is no need to specify each font resolution level to the font memory 20, enabling font data to be acquired at high speed. For example, when a user wishes to simultaneously output the same font to a printer and display it on a display device using a computer, because the resolution of the display device and the printer are normally different, it is possible to obtain font data rapidly and at a resolution appropriate to the output device using the above font data acquisition processing.

Next, the font memory according to the third embodiment will be described. In the font memory according to the third embodiment, signals indicating the density levels of dots forming a font pattern are output as output signals further to the font memory according to the above first embodiment.

Figure 4:
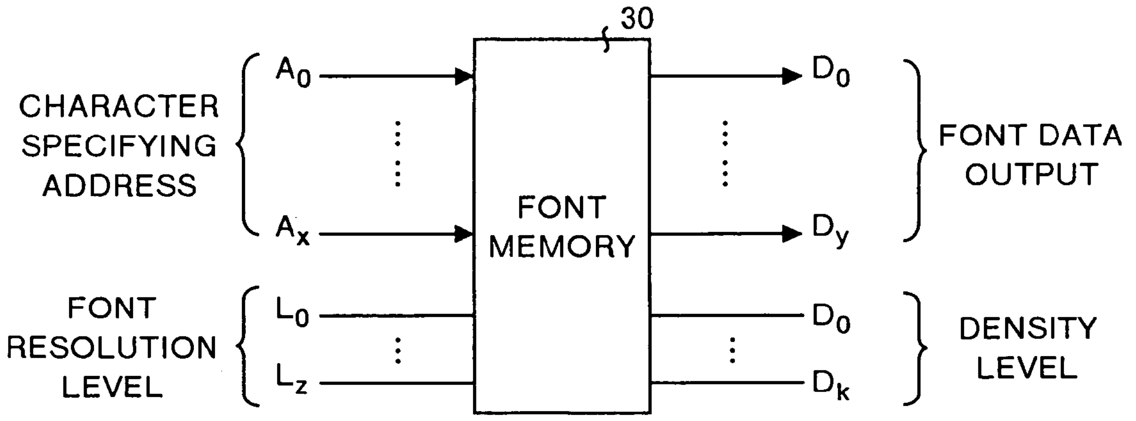
FIG. 4 is an explanatory diagram showing the font memory according to the third embodiment.

FIG. 4 is an explanatory diagram showing the font memory according to the third embodiment. In FIG. 4, the font memory 30 is able to output density levels $DB_0$ to $DB_k$ as output signals. The density levels $DB_0$ to $DB_k$ are formed from a plurality of bits and comprise information that is effective when it is possible to adjust the density of a dot in an output device. Due to the presence of the density levels $DB_0$ to $DB_k$, when signals specifying the low resolution levels 1 and 2 are input as font resolution levels, by adding this density information to the character structure addresses, the calculation that accompanies the anti-aliasing in the CPU is reduced, enabling printing and character display using a small number of dots. Note that it is also possible to structure the font memory 20 described in the above second embodiment such that density levels can be output, in the same way as in the font memory 30.

Next, the fourth embodiment of the present invention will be described with reference made to the drawings. In the fourth embodiment, the format of the font data output in the font memory according to the first to third embodiments is described. Here, the format of font data in a structure the same as that of the font memory 10 according to the first embodiment is described, however, because the font memories according to the second and third embodiments are the same, a description thereof is omitted here.

Figure 5:
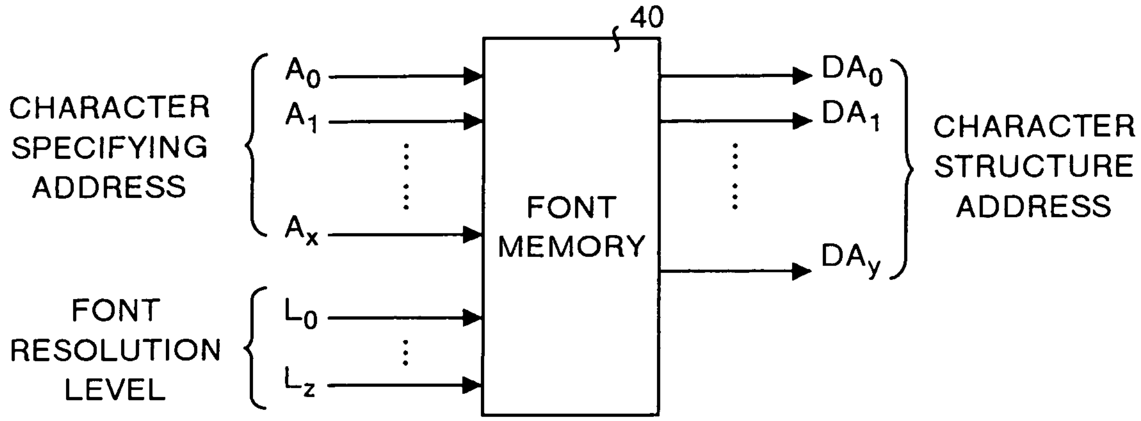
FIG. 5 is an explanatory diagram showing the font memory according to the fourth embodiment.

FIG. 5 is an explanatory diagram showing the font memory according to the fourth embodiment. In FIG. 5, instead of the font data outputs $D_0$ to $D_y$ of the font memory 10 shown in FIG. 1, the character structure addresses $DA_0$ to $DA_y$ are output in the font memory 40. In this case, the term character structure address refers to a bit code that expresses the arrangement of dots in the plurality of areas created when the matrix of a font pattern specified by the font resolution levels $L_0$ to $L_z$ and the character specifying addresses $A_0$ to $A_x$ is divided into a plurality of areas.

Figure 6:
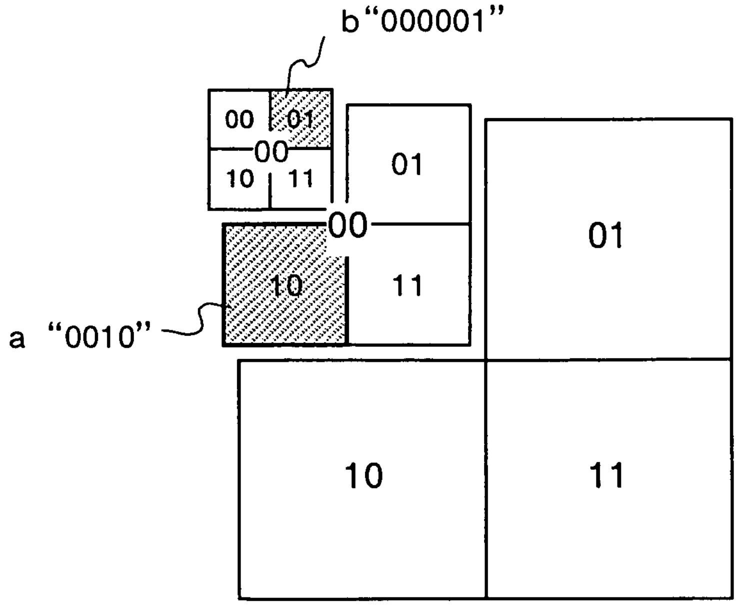
FIG. 6 is an explanatory diagram showing the concept of creating a character structure address.

FIG. 6 is an explanatory diagram showing the concept of creating a character structure address. In FIG. 6, a font pattern shown on an 8×8 dot (level 3) matrix is used as an example. Firstly, as is shown in FIG. 6, an 8×8 dot matrix is divided into four, creating four areas of 4×4 dots each. 2-bit codes (00, 01, 10, 11) are then given to each of the four created areas in the order of top left, top right, bottom left, and bottom right. Each of the created 4×4 dot areas is further divided into four, and 2-bit codes are given to each of the created 2×2 dot areas as described above. Each of the created 2×2 dot areas is further divided into four, and 2-bit codes are given to each of the created 1×1 dot areas as described above.

When a code given to a larger area is defined as a higher level bit, then, for example, the area a in FIG. 6 can be expressed as 0010, and the area b can be expressed as 000001. In this way, an area formed from a cell that is the smallest unit of the matrix or from a plurality of these cells can be defined as a bit code, and this bit code is called the address information.

FIG. 7 is an explanatory diagram showing the structure of a character structure address output from the font memory 40. As is shown in FIG. 7 (*a*), the character structure address is formed from display resolution information, the above address information, and display data information. The display resolution information is information showing the number of times a matrix is divided in the above address information creating process. Consequently, the display resolution information for the area a shown in FIG. 6 is 2, while the display resolution information for the area b shown in FIG. 6 is 3. The display data information is information showing the existence or otherwise of dots. Here "1" means that a dot is filled in, while "0" means that a dot is clear.

Note that, in FIG. 7, the display data information has been included in the structure of the character structure address and is output as character structure addresses $DA_0$ to $DA_y$, however, it is also possible to provide an exclusive output terminal in the font memory 40 for outputting this data display information. Moreover, it is also possible to ensure the display data information is not used by outputting the character structure address of only that portion in which display data is present.

For example, the character structure address indicating the level 3 font pattern "あ" (Roman alphabet=a) shown in FIG. 2 is as shown in FIG. 7 (*b*). In this case, the display resolution information is expressed in four bits. However, the number of bits necessary for the address information differs depending on the contents of the display resolution information and, as is shown in FIG. 7 (*b*), may be defined as a variable length in accordance with the display resolution information, or, as a fixed length, it is also possible to ignore the unnecessary bit portions.

In the font memory 40 according to the fourth embodiment, as in the font memory 10 according to the first embodiment, the font data is stored as a dot pattern and it is also possible, when that font data is output, for the above character structure address creation to be performed and the created character structure address to be output. However, it is preferable for character structure addresses corresponding to each group of font data to be created in advance and for these character structure addresses to be stored as font data.

As has been described above, according to the font memory 40 of the fourth embodiment, in addition to the effects of the font memory according to the first to third embodiments, because it is possible to output character structure addresses $DA_0$ to $DA_y$ formed from address information specifying dot positions within a plurality of areas created by dividing the matrix used for the basis of the font pattern into four units, display resolution information showing the number of divisions, and display data information showing the existence or otherwise of a display dot, when the existence or otherwise of over half of the dots in the areas created by the above division is recognized, it is possible to reduce the amount of information specifying a dot pattern by filling in or clearing the dots in all the cells within those areas.

Note that, in the fourth embodiment, addresses were given to areas obtained by dividing a matrix into four, however, it is also possible to employ a mode of division other than this, for example, one in which only the vertical direction is divided. Moreover, when font data in this format is applied in the font memory according to the third embodiment, it is also possible to express the display data information from among the character structure address in a plurality of bits, and substitute this display data information as the density levels $DB_0$ to $DB_k$.

Next, as the fifth embodiment, the flow of the font display processing when a font is displayed on a display device using character structure addresses output from the font memory according to the fourth embodiment will be described.

Figure 8:
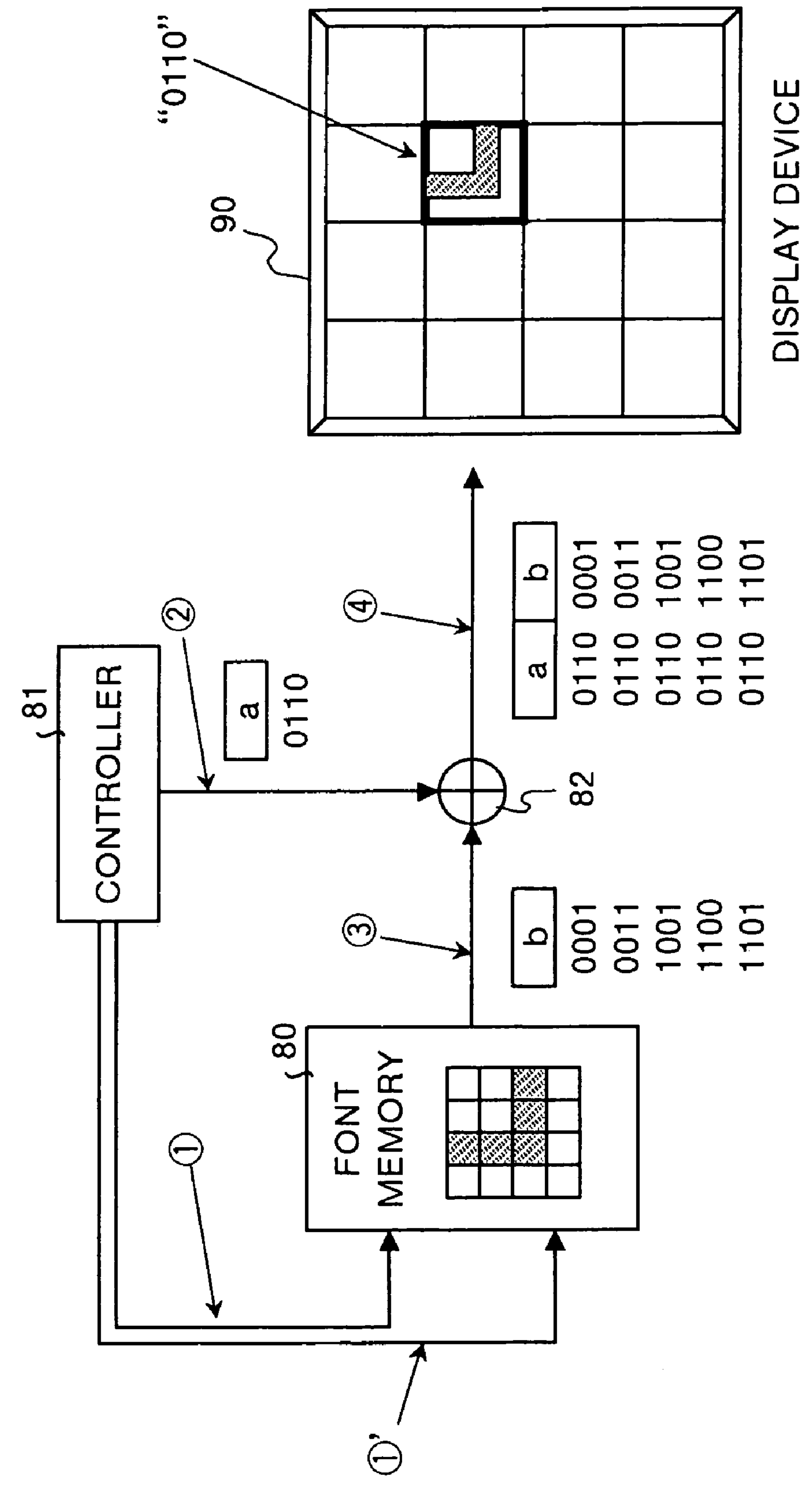
FIG. 8 is an explanatory diagram showing the flow of font display processing in a device provided with the font memory according to the present embodiment.

FIG. 8 is an explanatory diagram showing the flow of font display processing for displaying a font on a display device based on signals output from font memory in a device provided with the font memory according to the present invention. In this case, with consideration given to font memory 80 (including the font memories 10, 20, and 30 when the font data format described in the fourth embodiment is applied) that is built into a computer, a system formed from a controller 81 for performing processing relating to the font and a display data generating section 82 for adding display position information from the controller 81 to a character structure address output from the font memory 80 so as to generate display data, and outputting generated display data to a display device 90 will be described.

In order to facilitate understanding of FIG. 8, an example will be considered in which a font pattern formed on a font resolution level 2, 4×4 dot matrix is output from the font memory 80. Specifically, the character represented by the font is set as 'L', the display device is formed from an 8×8 dot screen, and the character 'L' is displayed on the display device 90 at a position address of 0110. Note that the position address indicating the display position on the display device 90 can also be specified using address information such as that described in the second embodiment.

Firstly, the controller 80 makes a request, for example, for the output of font data of the character 'L', which is in a Gothic typeface, to the font memory 80, namely, a transmission of a character specifying address and font resolution level (step ①). At this time, the font resolution level is simultaneously specified as 2 (step ①'). As a result of step ① and step ①', the font memory 80 outputs the relevant font data as character structure addresses (step ③). Note that, in the figures, in order to simplify the description, only the address information is shown from the character structure address.

Next, as is shown in FIG. 8, the character structure address 'b' output from the font memory 80 is input to the display data generating section 82. Meanwhile, the controller 81 transmits a character specifying address and a font resolution level to the font memory 80 and transmits a position address 'a' indicating a position on the display device 90 for displaying the font to the display data generating section 82 (step ②).

The display data generating section 82 generates display data a+b by adding the position address 'a' to the character structure address 'b', and transmits the generated display data a+b to the display device 90 (step ④). The display device 90 receives the display data a+b and displays the character 'L', indicated by the character structure address 'b', at the position of the position address 0110.

In the font display processing described above, because the position displayed on the display device 90 (the display address 0110) is matched with address information shown as one of the areas created when the position addresses are generated in the display device 90, it is possible to display the character 'L' from the display data received from the display data generating section 82, however, when the character 'L', indicated by the character structure address 'b', is displayed at a position where the position displayed on the display device 90 cannot be expressed as address information showing an area created during the generating of the position addresses, then a special display processing is required.

Figure 9:
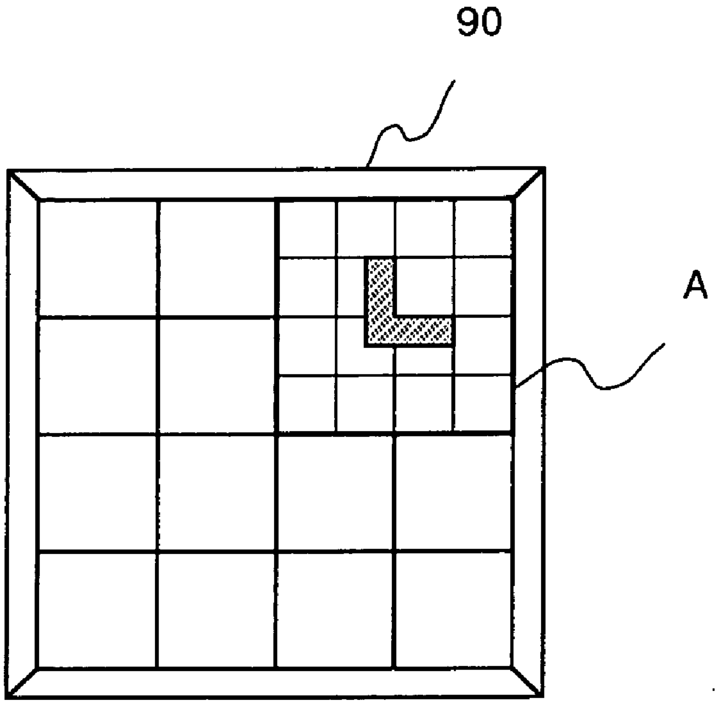
FIG. 9 is an explanatory diagram showing an example of a font pattern display.

FIG. 9 is a diagram showing an example when the character 'L' (4×4 dots) indicated by the above character structure address 'b' is displayed at the center of an area A (actually 8×8 dots) represented as the position address 01 on the display device 90. In a case such as that shown in FIG. 9, the matrix (4×4 dots) on which the character 'L' indicated by the character structure address 'b' is displayed cannot be specified as one position address on the display device 90, and is placed extending over the area 010011, the area 010110, the area 011001, and the area 011100 on the display device 90.

Figure 10:
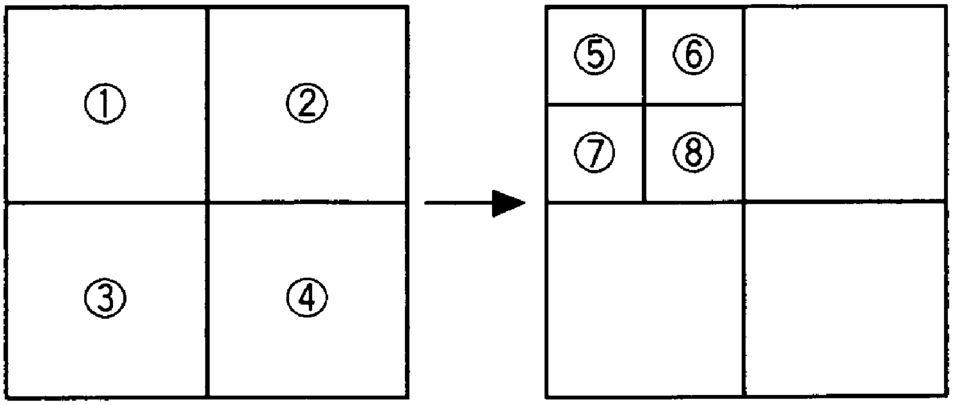
FIG. 10 is an explanatory diagram showing an example of font display processing and FIG. 11 is an explanatory diagram showing the flow of another font display processing.

Therefore, the matrix (4×4 dots) containing the character 'L' is divided into 4 and, as is shown in FIG. 10, output is fixed in the order ①-②-③-④ from top left and, in an area (2×2 dots) obtained by dividing these into four the output of the address information is further fixed in the order from top left ⑤-⑥-⑦-⑧. Specifically, from the character structure address 'b', firstly, 000 indicating the relative address information and display data information of ⑤ in the area ① is extracted, and then in the same way, 011 indicating in the area ①, 100 indicating in the area ①, and 111 indicating ⑧ in the area ① are extracted, and the address information of the area 010011 on the above display device 90 is added to the front of these and output. In the same way, the address information of the area 010110 is added to each set of address information in the area ②, the address information of the area 011001 is added to each set of address information in the area ③, and the address information of the area 011100 is added to each set of address information in the area ④ and output is then made to the display device 90.

Figure 11:
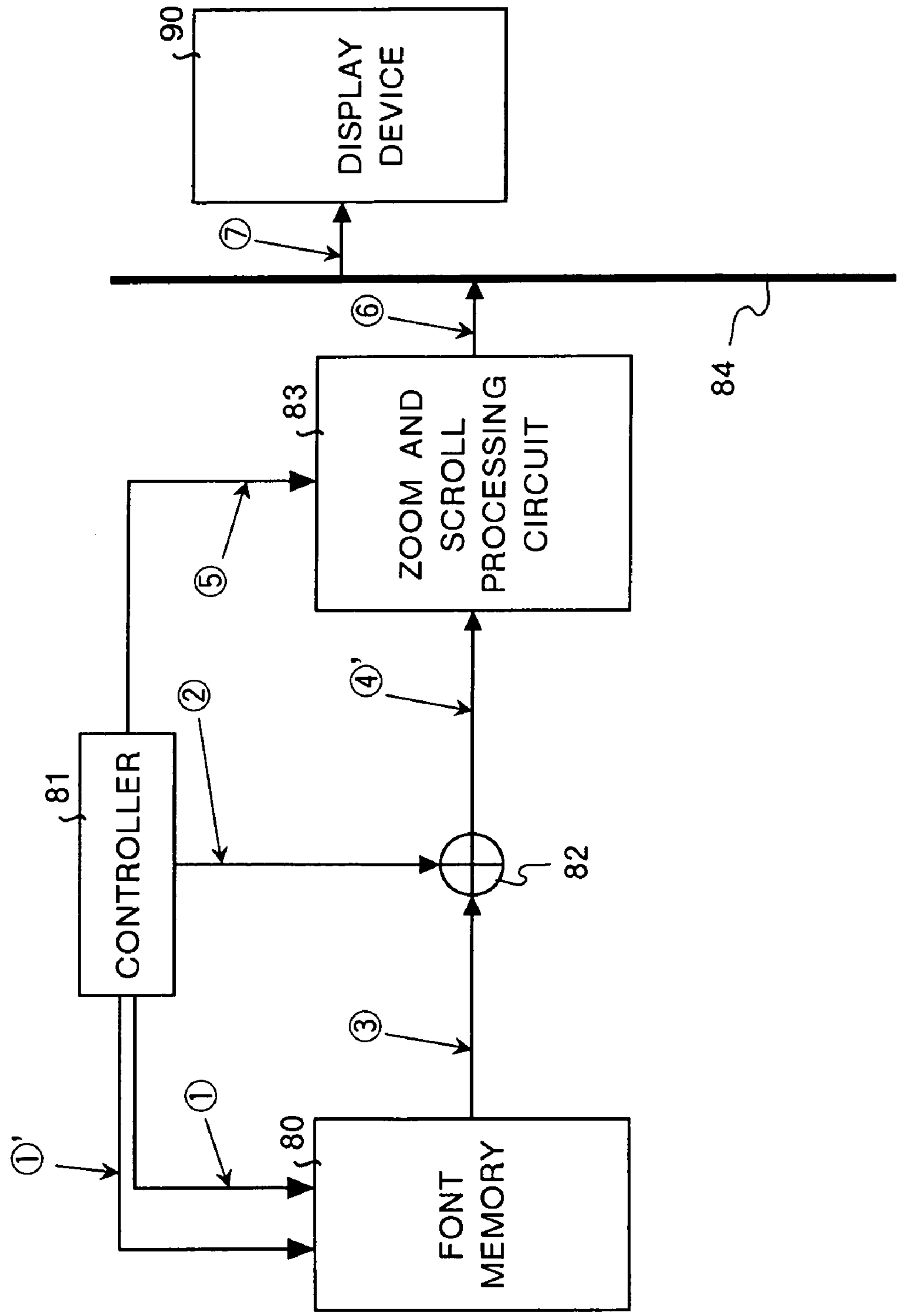

However, in this method, because the address information of portions in which there are no dots is also output, unnecessary processing occurs. FIG. 11 is an explanatory diagram showing the flow of font display processing to solve this problem. The system shown in FIG. 11 differs from the system shown in FIG. 8 in that a zoom and scroll processing circuit 83 and a display data bus 84 have been added, step ④ has been replaced with step ④', and steps ⑤ to ⑦ have been added. Note that the same symbols have been given to portions common to FIG. 8 and a description thereof has been omitted. Moreover, the position address 'a' transmitted in step ② is set at 01.

Firstly, in step ④', the display data generating section 82 generates display data a+b by adding the position address 'a' to the character structure address 'b'. The generated display data a+b is then transmitted to the zoom and scroll processing circuit 83. The zoom and scroll processing circuit 83 extracts the smallest area containing the matrix (4×4 dots) containing the character 'L' indicated by the character structure address 'b' from the areas created on the display device 90. As is shown in FIG. 9, this smallest area corresponds to the top right area A when the display screen is divided into four.

If the display data a+b acquired in step ④' is displayed in its current state on the display screen of the display device 90, it is displayed at a magnification of four times the actual font pattern as the character 'L' containing the area A indicated by the address information 01. Therefore, it is necessary to reduce this to the required size and move it to the display position. This reduction processing and movement processing can be easily performed by a rapid calculation using bit operation, and the controller 81 instructs the movement amount and direction of contraction by the zoom and scroll processing circuit 83 (step ⑤).

In the zoom and scroll processing circuit 38, the display data that has been modified to the correct size and correct position is sent to the display data bus 84 (step ⑤). Moreover, because other data, such as the density level and the like shown in the third embodiment, is output from the font memory 80, in addition to the character structure address forming the display data, the type of data that is necessary in the display device 90 is all transmitted to the display device 90 via the display data bus 84 (step ⑦).

As has been described above, according to the flow of the font display processing described in the fifth embodiment, it is possible to perform the rapid display of a font on the display device 90 based on character structure addresses output from the font memory 80 to which the font data format described in the fourth embodiment has been applied. In this font display processing, in particular, because the control 81 does not perform a complicated calculation processing, there is no load thereon and no impediment to the processing of other tasks executed in parallel with the font display processing. Therefore, it is possible to improve the throughput of the controller 81.

Note that the processing in the zoom and scroll processing circuit 83 and the display data generating circuit 82 may be performed by the controller 81 itself. In this case as well, because the calculation processing is not complicated, the task processing does not cause any great problems.

In the embodiments 1 to 5 described above, a description was given of when font data was stored in font memory formed from semiconductor memory and used. However, when storing the data of large sized fonts or fonts for which a higher resolution is desired such as calligraphic fonts, a huge storage volume, which cannot be provided by semiconductor memory, is needed. In cases such as these, it is also possible to store font data for each resolution level as described in the embodiments on an information storage medium such as a CD-ROM and DVD that can be read by a computer and use this. Moreover, it is of course possible to install font data stored on this type of information storage medium on a fixed magnetic disc or the like and then use the font data from there.

As described above, in the font memory of the present invention, because font data is stored that is different for each resolution level, and because the font memory is provided with a plurality of first terminals for the input of character specifying address signals, a plurality of second terminals for the input of resolution level signals, and a plurality of output terminals for the output of font data having the optimum resolution to match the resolution of an output device such as a display device or a printer in accordance with the above character specifying address signals and resolution level signals, if, for example, an enlarged display is performed on a display device or if printing is performed using a printer capable of a high quality output, font data having a higher resolution level is specified. Moreover, if a reduced screen is displayed or if a layout is being confirmed, it is possible to specify font data having a lower resolution level. Consequently, no unnecessary load is placed on the controller or CPU performing the font output processing enabling highly efficient, rapid font output results to be obtained.

Further, in the font memory of the present invention, because the font memory is provided with a plurality of first output terminals for the successive output of font data having different resolution levels and a plurality of second output terminals for the output of resolution level signals accompanying the above output of font data, when an output device that is attempting to use this font memory or a controller or CPU with this font memory incorporated therein acquires font data having a plurality of different resolution levels, it is possible to acquire the font data rapidly without having to specify the respective font resolution level of each in the font memory.

Further, in the font memory of the present invention, because the density level is calculated when the font data is output and displayed, and because the font memory is provided with a density level output terminal for the output of a density level signal indicating the density level, it is possible to avoid (or to lower) the anti-aliasing calculation and the like in the CPU and output side because direct output to a printing device or display device capable of displaying the density is possible using the density level and the font data that is output when a resolution level signal specifying a low resolution level is input.

Further, in the font memory according to the present invention, because a plurality of groups of font data having different resolution levels and represented by a dot pattern are stored for each character code, and because this font data is information that allocates an exclusive address to each dot forming each dot pattern and that can indicate a dot pattern using the dot exclusive addresses, the font data can be treated as font data that includes information indicating the font size and display position, and the calculation processing for outputting a font can be reduced in the display device and printing device.

Further, in the font memory according to the present invention, because a plurality of groups of font data having different resolution levels and represented by a dot pattern are stored for each character code, and because each dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and because the font data is information that can represent the dot pattern using the addresses ultimately obtained by repeating the above division and address allocation thereafter for an optional number of times, it is possible to obtain a font having an optimum dot pattern in accordance with the resolution of an output device such as a printer or display device. At the same time, it is possible to effectively utilize the memory resources with only the information specifying the font shape being stored efficiently, by combining the addresses of both large and small pattern areas.

Further, in the font memory of the present invention, because a plurality of groups of font data having different resolution levels and represented by a dot pattern are stored for each character code, and because each dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and because the font data is information representing the dot pattern using the addresses obtained by repeating the above division and address allocation thereafter for an optional number of times, it is possible to obtain a font having an optimum dot pattern in accordance with the resolution of an output device such as a printer or display device. At the same time, it is possible to effectively utilize the memory resources with only the information specifying the font shape being stored efficiently, by combining the addresses of both large and small pattern areas.

Further, in the font data reading method according to the present invention, because font data corresponding to the character codes specified by the character specifying address signals and corresponding to a resolution level specified by the resolution level signals is read from an information storage medium on which is stored a plurality of groups of font data having different resolutions and represented by a dot pattern are stored for respective character codes, not only is it possible to acquire font data whose resolution level is in accordance with the resolution of the output device or with the purpose of use, but also, for example, by using a CD-ROM or DVD or the like as an information storage medium, it is possible to deal with a large volume of font data more cheaply than if semiconductor memory were used.

INDUSTRIAL APPLICABILITY

As described above, the font memory and font data reading method according to the present invention enables confirmation of the approximate layout of a character on a display device and can be applied when outputting font data having different resolutions in accordance with the aim of the usage, such as when it is necessary to display a high quality font only in the result of an output obtained when printing using a printer, or when it is necessary to use a high resolution large sized display device, or when it is necessary to enlarge the display of characters on a display device.

The invention claimed is:

1. A font memory in which a plurality of groups of font data having different resolutions and represented by a dot pattern are stored for respective character codes, comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input terminals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, wherein an exclusive address is given to each dot forming the dot pattern, and the font data is information representing the dot pattern using the address exclusive to a particular dot.

2. A font memory in which a plurality of groups of font data having different resolutions and represented by a dot pattern are stored for respective character codes, comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input terminals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

3. A font memory in which a plurality of groups of font data having different resolutions and represented by a dot pattern are stored for respective character codes, comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input terminals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

4. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, wherein an exclusive address is given to each dot forming the dot pattern, and the font data is information representing the dot pattern using the address exclusive to a particular dot.

5. A font memory in which a plurality of groups of font data having different resolutions and represented by a dot pattern are stored for respective character codes comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input terminals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, and further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, wherein an exclusive address is given to each dot forming the dot pattern, and the font data is information representing the dot pattern using the address exclusive to a particular dot.

6. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, wherein an exclusive address is given to each dot forming the dot pattern, and the font data is information representing the dot pattern using the address exclusive to a particular dot.

7. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

8. A font memory in which a plurality of groups of font data having different resolutions and represented by a dot pattern are stored for respective character codes, comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input tern signals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, and further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, and wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

9. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

10. The font memory according to claim 4, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

11. The font memory according to claim 5, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

12. The font memory according to claim 6, wherein the dot pattern is divided by a first division unit into a plurality of pattern areas, an address for identifying the relevant pattern area is allocated to each of the created pattern areas, each pattern area divided by the first division unit is further divided by a second division unit into a plurality of pattern areas, and an address for identifying the relevant pattern area is allocated to each of the pattern areas created using the second division unit, and wherein the font data is information representing the dot pattern using the addresses obtained by repeating the above division and address allocation thereafter for an optional number of times.

13. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

14. A font memory in which a plurality of groups of font data having different resolutions and represented by a dot pattern are stored for respective character codes, comprising:

a plurality of first input terminals for input of character specifying address signals that specify the font data corresponding to a character code;

a plurality of second input terminals for input of resolution level signals that specify resolution levels of the font data; and a plurality of output terminals through which the font data in accordance with the input of said first input terminals and said second input terminals is output, wherein, based on character specifying address signals input from said first input terminals and resolution level signals input from said second input terminals, font data that corresponds to the character codes specified by the character specifying address signals and corresponds to the resolution levels specified by the resolution level signals is output from the output terminals, and further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, and wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

15. A font memory in which a plurality of groups of font data having different resolutions and represented by a dot pattern are stored for respective character codes, comprising:

a plurality of first input terminals for input character specifying address signals that specify the font data corresponding to a character code;

a plurality of first output terminals through which the font data in accordance with the input of said first input terminals is output; and a plurality of second output terminals through which resolution level signals representing a resolution level of the font data are output, wherein, the resolution level is sequentially altered at a predetermined timing and, in addition to font data corresponding to the character code specified by the character specifying address signals and corresponding to the resolution level being output from said first output terminals resolution signals representing the resolution level are output from said second output terminals, further comprising a plurality of density level output terminals through which density level signals specifying density levels when the dot patterns are displayed is output, wherein, based on the number of dots in the dot pattern, a density level is calculated when the dot pattern is displayed and density level signals specifying the calculated density level are output from said density level output terminals, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

16. The font memory according to claim 4, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

17. The font memory according to claim 5, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

18. The font memory according to claim 6, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

19. The font memory according to claim 7, wherein the dot pattern is divided into quarter pattern areas, two bit addresses 00, 01, 10, and 11 are allocated to each of the creates pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

20. The font memory according to claim 8, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

21. The font memory according to claim 9, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

22. The font memory according to claim 10, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

23. The font memory according to claim 11, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

24. The font memory according to claim 12, wherein the dot pattern is divided into quarter pattern areas, two bit addresses 00, 01, 10, and 11 are allocated to each of the created pattern areas, each created pattern area is further divided into quarter pattern areas, and two bit addresses 00, 01, 10, and 11 are further allocated to each of the created pattern areas, and wherein the font data is information representing the dot pattern using the addresses obtained by repeating the above division and address allocation thereafter for an optional number of times.

* * * * *